United States Patent
Tarbox et al.

(10) Patent No.: US 6,328,260 B1
(45) Date of Patent: Dec. 11, 2001

(54) WING SPAR MODIFICATION KIT

(76) Inventors: Jack M. Tarbox, 17 Emerson St., Sanford, ME (US) 04073; Philip J. Baker, 28 Nestledown Rd., Laconia, NH (US) 03246

( * ) Notice: Subject to any disclaimer, the term of this patent is extended or adjusted under 35 U.S.C. 154(b) by 1 days.

(21) Appl. No.: 09/696,127

(22) Filed: Oct. 25, 2000

(51) Int. Cl.[7] ....................................................... B64C 1/06
(52) U.S. Cl. ........................................... 244/131; 244/123
(58) Field of Search .................................. 244/123, 131, 244/124, 117 R, 119

(56) References Cited

U.S. PATENT DOCUMENTS

| | | |
|---|---|---|
| 3,499,622 | 3/1970 | Lugan et al. . |
| 3,827,661 | 8/1974 | Ryan et al. . |
| 4,411,380 | 10/1983 | McWithey et al. . |
| 4,624,599 | 11/1986 | Piasecki . |
| 4,962,904 | 10/1990 | Perry et al. . |
| 4,984,347 | 1/1991 | Cox ................................... 29/402.06 |
| 5,297,760 | 3/1994 | Hart-Smith . |
| 5,735,626 | 4/1998 | Khatiblou et al. . |
| 5,944,286 | * 8/1999 | Morris et al. ......................... 244/131 |
| 5,975,237 | 11/1999 | Welch et al. .......................... 181/290 |

OTHER PUBLICATIONS

–Revo, Inc. Service Bulletin B–79 of May 27, 1999.
–Notice of Proposed Rulemaking, IN: Federal Register, Oct. 6, 1999, vol. 64, No. 193.

* cited by examiner

*Primary Examiner*—J. Woodrow Eldred
(74) *Attorney, Agent, or Firm*—Thomas L. Bohan; Patricia M. Mathers (57) ABSTRACT

A kit for reinforcing the wing spar attachment of Lake models of amphibious airplanes. The kit includes two filler-straps and two doubler-straps for each wing spar, and the necessary bolts, rivets, washers and nuts to attach the straps to the wing spar web. The doubler-straps are constructed to fit all models of Lake amphibious airplanes; the thickness of the filler-straps is, however, specific to the model of airplane or the model of wing in which they are to be installed. The doubler-straps and the filler-straps are pre-treated to protect them against corrosion and are marked so as to preclude incorrect inspection. The inboard end of the doubler-strap is angled to correspond to the angle of the wing spar relative to a vertical plane of the airplane.

14 Claims, 6 Drawing Sheets

WING SPAR MODIFICATION KIT

BACKGROUND OF THE INVENTION

1. Field of Invention

The invention relates to the field of fixed-wing aircraft. More particularly, the invention relates to the various models of Lake amphibious aircraft, as manufactured by Aerofab, Inc. More particularly yet, the invention relates to a device for strengthening wing spars on such aircraft.

2. Description of Prior Art

Forces exerted on the wings of aircraft during landing impose stresses on the wing structures. These stresses are even greater on wing structures of amphibious aircraft during water landings because the shock-absorbing devices that are integrated into the landing gear are not available when landing on water. It has been determined that the method of wing spar attachment used in certain Lake amphibious aircraft models may result in cracks in the wing spar, specifically, in the wing spar cap and wing spar attachment bolt-holes. The wing spar serves to attach the wing to the aircraft fuselage and these cracks have the potential to cause separation of the wing from the fuselage during flight, with obvious deleterious consequences.

Due to the seriousness of a wing spar structural failure, the Federal Aviation Administration(FAA) issued an airworthiness directive (AD) for the wing spar on the Lake models of amphibious aircraft, directing that the referenced aircraft be repaired or modified within a specific timeframe in accordance with the AD. The particular problem to be solved was the elimination of the structural deficiencies of the wing attachment due to cracks initiating at a machined notch at the flange termination point of the wing-spar cap angle. One correction proposed was frequent inspection and replacement of the wing-spar cap angle upon the detection of cracks. This solution is, however, very costly and time-consuming—it being a very labor-intensive and time-consuming task to replace parts of the wing spar, with a typical cost of $40,000. An alternative to that first approach is to physically strengthen the wing spar prophylactically by, for example, adding an additional layer of metal to the vulnerable element.

In the field of aircraft manufacturing, the application of an additional layer of material, commonly called a "doubler," as a means of reinforcing a structural component is well known. For example, Cox (U.S. Pat. No. 4,984,347) describes a means of attaching a doubler to the damaged skin of an airplane as a means of reinforcing the damaged area. Welch et al. (U.S. Pat. No. 5,975,237) describes the use of a doubler for the purpose of reinforcing an acoustic panel for installation in the nacelle of a jet engine. Although both of these doubler inventions serve to strengthen aircraft elements, neither provides a solution to the specific problem at hand, which is not as straightforward as slapping more metal on the spar.

When using a doubler to modify a primary structural element, it is critical that the strength and rigidity properties of the doubler and the structural element complement each other. For example, a doubler-strap that is too rigid or has greater strength than the underlying element may itself cause stresses on the element and introduce additional sources of cracking and structural weakness. Conversely, a doubler-strap that is too flexible or has less strength than the underlying element will not provide the additional strength and reinforcement that is required. Without access to comprehensive engineering data on the components to be strengthened and on its related flight elements, it can be very difficult to determine the proper strength characteristics required in a doubler without having to carry out a lengthy testing process that may also include destructive tests and, consequently, be very costly because of the material costs.

A further difficulty in constructing a doubler-strap modification kit to solve the particular problem at hand is that there are a number of different aircraft models with wing spars that required strengthening, with dimensions of the area requiring strengthening varying with model, and to a lesser extent any individual plans of a particular model. It is desirable for obvious economic and safety reasons to have a strap that could be installed on all aircraft units requiring treatment.

Another factor that must be taken into account in developing a doubler as a means of structural reinforcement of a wing spar is the problem of corrosion. In order to serve its intended purpose, the wing-spar doubler must be resistant to any corrosion that could lead to structural weakness. This becomes a critical issue with amphibious planes, the wings of which may be expected to be regularly exposed to salt water to a degree not found in the non-amphibious planes that make up the vast majority of the world's aircraft. Salt water heightens the electro-voltaic effect that is present whenever dissimilar metals are in contact with one another.

Finally, as a safety issue, as well as an economic issue, the doubler reinforcement must be simple to install. Preferably, the doubler should be able to be installed using standard tools that are readily available at airplane maintenance facilities, and not require special skills beyond those of ordinary airplane maintenance personnel. In addition, it must be easily determinable upon a simple post-installation inspection that the doubler has been properly installed.

What is needed, therefore, is a cost-efficient effective means of strengthening the wing spars on all models of Lake aircraft. What is further needed is a modification that can be retrofitted to any model of Lake aircraft, properly and easily, with a minimum of disassembly and without causing collateral damage to other installed parts. What is yet further needed is such a modification that will provide a long-term solution to the wing spar cracking problem, that will not cause additional structural problems, and that is corrosion-resistant in a sea water environment and not subject to harmful electro-voltaic effects.

SUMMARY OF THE INVENTION

It is an object of the present invention to provide a simple-to-install doubler modification kit for strengthening the wing spar on Lake aircraft models. It is a yet further object of the invention to provide such a kit that will strengthen the wing spar for the service life of the aircraft, without introducing additional structural problems.

These objects have been achieved in the present invention by providing a doubler-strap modification kit comprising an upper and a lower doubler-strap of specific configuration and constitutions, a filler-strap for each doubler-strap, and a plurality of bolts, rivets, nuts, and washers to attach the doubler-straps to the wing spar. The wing spar on the aircraft comprises a wing spar web and two wing-spar cap angles, one on each side of the in-board end of the web. Each doubler-strap and filler-strap has a series of bolt-holes that corresponds precisely to the pattern of wing attach bolt-holes in the Lake wing spar web. The holes in the doubler and filler-straps are drilled with the same drilling fixture used to drill the holes in the wing spar itself so as to achieve a very high degree of precision with the same size for all matching holes. Each doubler-strap also has an additional bolt-hole on the inboard end of the strap that corresponds to a bolt-hole on the wing-spar cap angle.

A filler-strap may be made of a material different from that of the doubler, for reasons of cost-effectiveness or for structural reasons. In the present invention, the web spar web is made of aluminum, so the filler-strap is also made of aluminum, to eliminate the danger of corrosion on the web spar resulting from contact between dissimilar metals. The doubler-strap, is made of steel for structural reasons. Direct contact between the aluminum filler-strap and the steel doubler-strap, however, introduces the risk of corrosion on these two parts, thereby exacerbating concerns of prolonged structural integrity. To counter this problem, the doubler-strap is coated with a protective coating that is a heat-cured ceramic powder coating, either Midrofin Allseal or preferably SermeTel® 5380DP, and the filler-straps are coated with an alodine conversion coating and then a primer coat. This effectively eliminates direct contact between the dissimilar metals, and, furthermore, decreases the risk of corrosion arising from salt water environments. Furthermore, the aluminum filler-strap, which is more easily replaceable than the doubler-strap, will corrode before the doubler-strap.

A filler-strap may be made of a material different from that of the doubler, for reasons of cost-effectiveness or for structural reasons. In the present invention, the web spar web is made of aluminum, so the filler-strap is also made of aluminum, to eliminate the danger of corrosion on the web spar resulting from contact between dissimilar metals. The doubler-strap, is made of steel for structural reasons. Direct contact between the aluminum filler-strap and the steel doubler-strap, however, introduces the risk of corrosion on these two parts, thereby exacerbating concerns of prolonged structural integrity. To counter this problem, the doubler-strap is coated with a protective coating, either Midrofin Allseal or preferably SermeTel® 5380DP, and the filler-straps are coated with an alodine conversion coating and then a primer coat. This effectively eliminates direct contact between the dissimilar metals, and, furthermore, decreases the risk of corrosion arising from salt water environments. Furthermore, the aluminum filler-strap, which is more easily replaceable than the doubler-strap, will corrode before the doubler-strap.

In order to construct a doubler-strap that could be used on all Lake model aircraft, the engineering data and drawings—including change orders generated over the past 50 years—and the results of various structural and fatigue analyses conducted on the aircraft wings were studied to determine the doubler-strap material and dimensions required to provide the needed wing-spar strengthening. A main difficulty was determining the proper dimensions to ensure a single-size doubler would fit all aircraft. In the course of solving the problem, it was determined that the initial doubler-strap prototype was too short and, although it would have solved the initial cracking problem on the wing-spar cap angle and would have satisfied the universality condition, was likely to cause additional cracking on the wing spar web in the area around the first outboard wing-attach bolt-hole. To solve this problem, the doubler and filler-straps were lengthened so as to extend further in the outboard direction and the minimum size of rivets used to attach the straps to the wing spar between the first outboard wing attach bolt and the outboard end of the strap, in addition to the bolts in the wing attach bolt-holes, was increased to AD6.

Further, it was determined that a single rectangular shape was inappropriate, since it was introducing additional and parasitic stresses onto the wing-spar cap angle. The wing spar is attached to a root rib that is then attached to the airplane body. The root rib is tipped outward relative to a central vertical plane of the aircraft, i.e., the upper inboard edge of the wing is farther from the central vertical plane than is the lower inboard edge of the wing, and the inboard end of the wing spar is angled correspondingly. In order to ensure that the doubler-strap does not push against the wing-spar cap angle and introduce new stresses, the inboard end of the doubler-strap of the present invention is angled to correspond to the angle of the wing spar. Because this angled inboard end introduced a directionality, the modification kit had to be provided as a right-wing kit and a left-wing kit. It was discovered that the filler and doubler-straps could be installed incorrectly, resulting in an interference between the doubler-strap and the wing-spar cap angle that was almost impossible to perceive because the intervention is most readily discernible when the straps are being laid in place and ascess to the area for visual inspection is effectively blocked by the arm of the person installing the parts. Once the parts are in place and the visual inspection is possible, the interference is effectively hidden from view. Although the interference was minor, it could have serious effects in the longterm on the airworthiness of the aircraft. In order to ensure that the doubler-strap is installed correctly, the right wing and left wing doubler and filler-straps are given part numbers that identify the parts as right wing or left wing parts. The particular part number is stamped on the "face forward" side of the strap, i.e., the side that faces toward the person installing the strap. Assembly instructions instruct that the part number must be legible on the forward side of the wing spar by the person installing the strap for the part to be installed correctly.

DETAILED DESCRIPTION OF THE PREFERRED EMBODIMENT OF THE INVENTION

Figure 1:
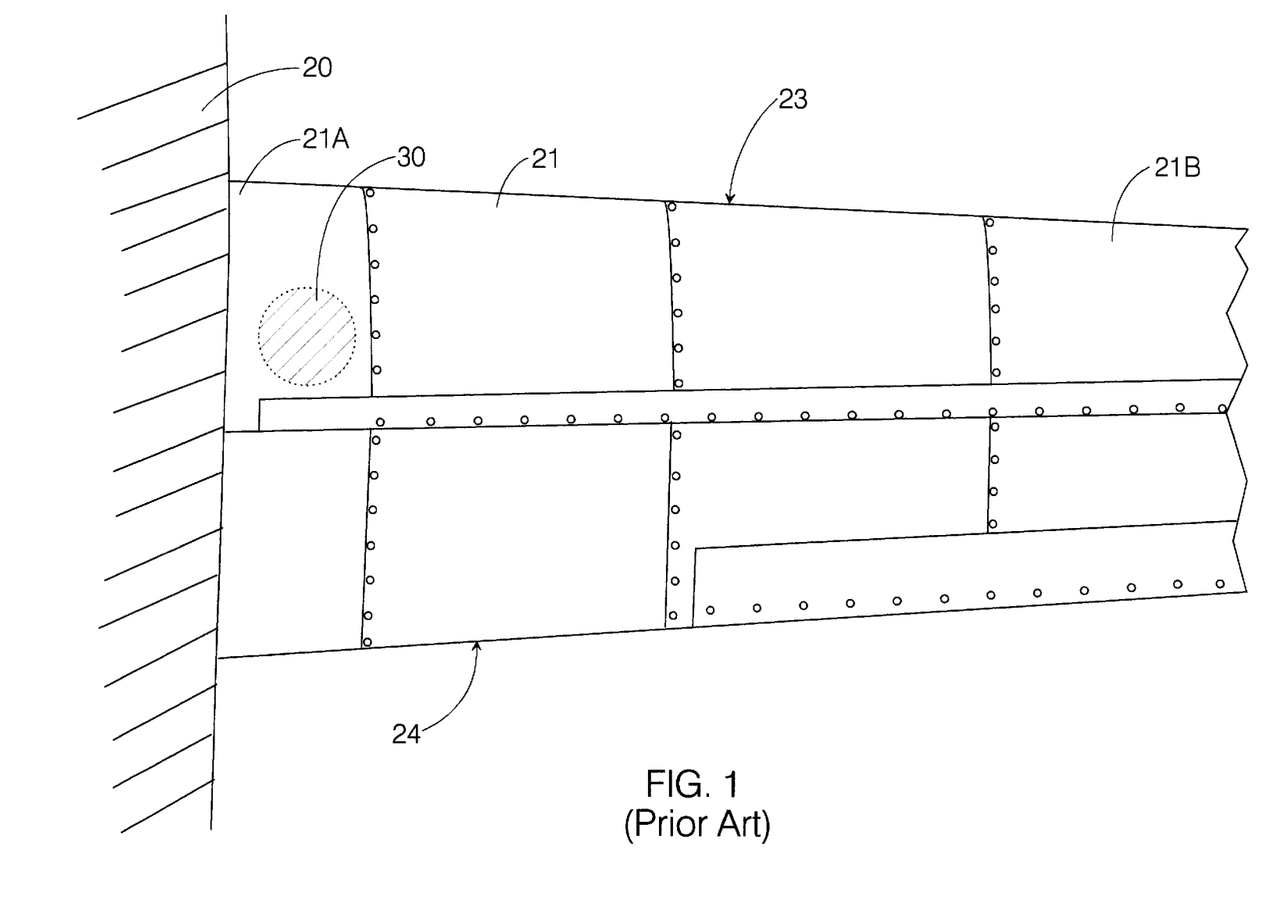
FIG. 1 is a partial view of a wing attached to the fuselage of an airplane (prior art), showing the location of the access hole for retrofitting a doubler kit according to the present invention on a wing spar.

FIG. 1 shows a partial view of a wing 21 attached to a fuselage 20 of an airplane that is indicated only schematically. The wing 21 has an inboard end 21A, i.e., the end of the wing 21 attached to the fuselage 20, an outboard end 21B, a leading edge 23, and a trailing edge 24. The wing 21 shown here is merely representative of those assembled in the models of the Lake amphibious aircraft, and is not intended to illustrate details of the shape or formation of the wing. Also shown in this view is an access hole 30, which provides access to some internal wing components at the inboard end 21A of the wing 21.

Figure 2:
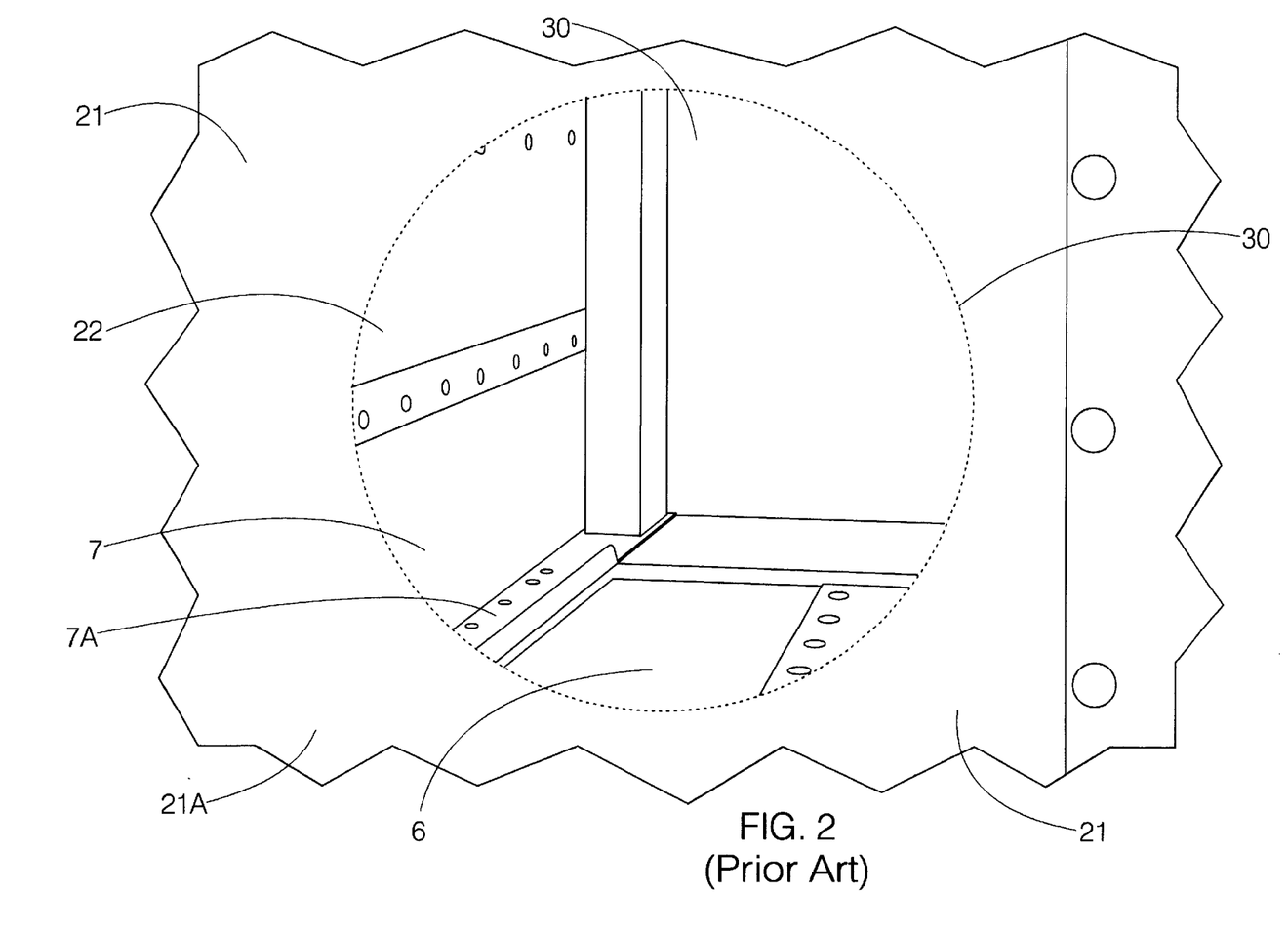
FIG. 2 shows a perspective view of the inboard end of the wing spar (prior art) as viewed through the access hole.

FIG. 2 is a perspective view through the access hole 30, showing wing components as viewed when the line of sight is into the access hole 30 and skewed slightly toward the inboard end 21A and the trailing edge 24 of the wing. Visible is an inboard end of a wing spar assembly comprising a wing-spar web 6 and a wing-spar cap angle 7. The cap angle 7 has a flange 7A that rests on the inboard end 21A of the wing-spar web 6 and is bolted to the wing-spar web 6 and a root rib 22.

Figure 3:
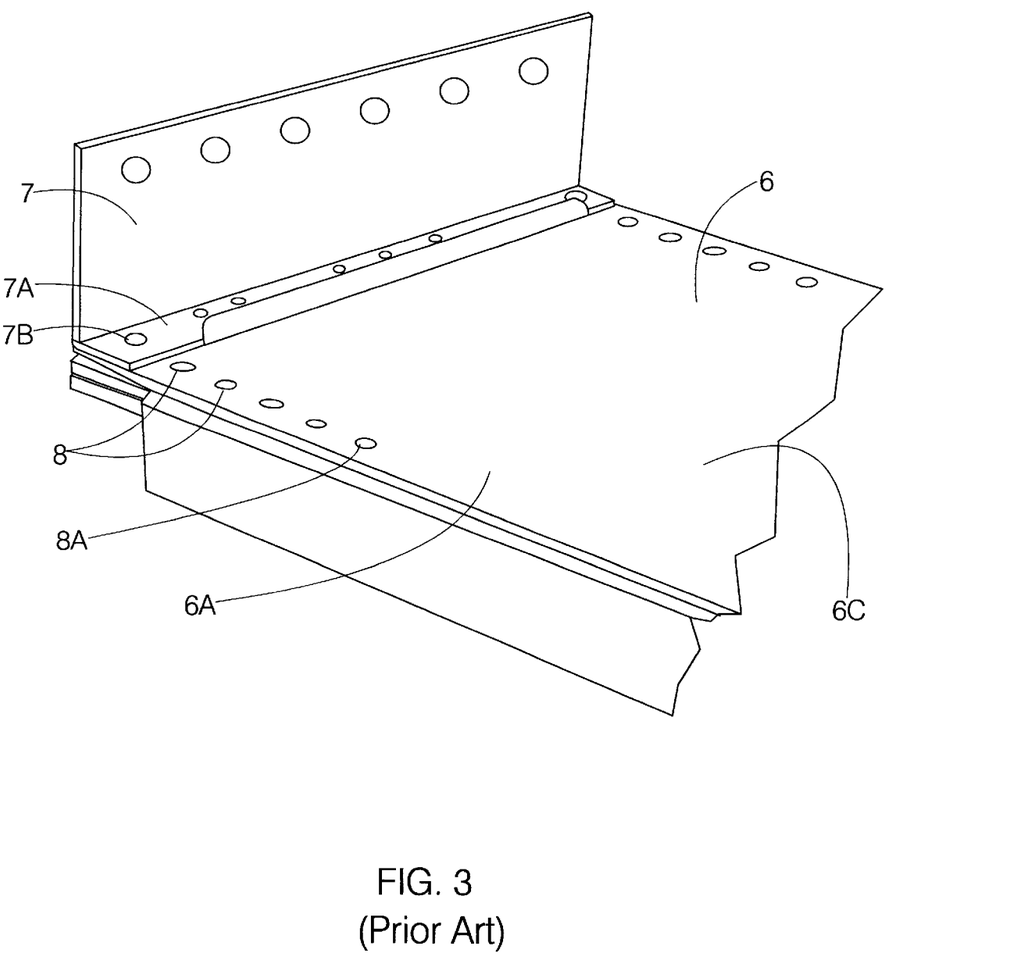
FIG. 3 shows a perspective view of the inboard end of an isolated wing spar (prior art), with the side of the wing spar that faces the leading edge of the wing facing up.

FIG. 3 shows a perspective view of an isolated wing spar assembly. A face forward side 6C, i.e., the side of the web 6 that faces toward the leading edge of the wing, is shown. The wing-spar web 6 has an upper web edge 6A and a lower web edge 6B. Located on the respective upper and lower web edges 6A, 6B are five ⅜" wing-attach bolt-holes 8, including a first outboard wing attach bolt-hole 8A. A ⁷⁄₁₆" flange bolt-hole 7B is provided through the cap angle flange 7A and at a matching location beneath the flange 7A through the wing-spar web 6.

Figure 4A:
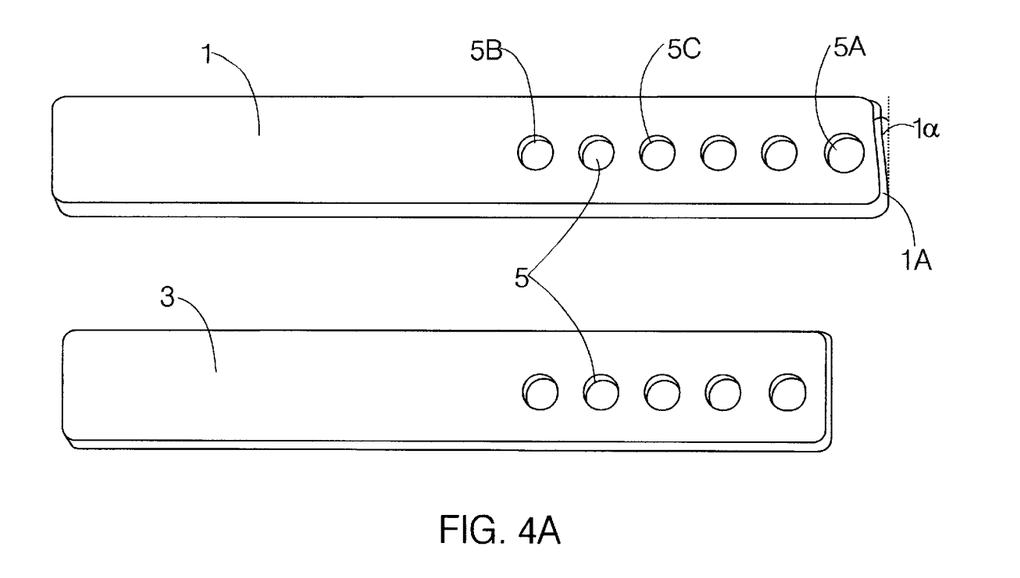
FIG. 4A shows the upper doubler-strap and upper filler-strap of the present invention.
Figure 4B:
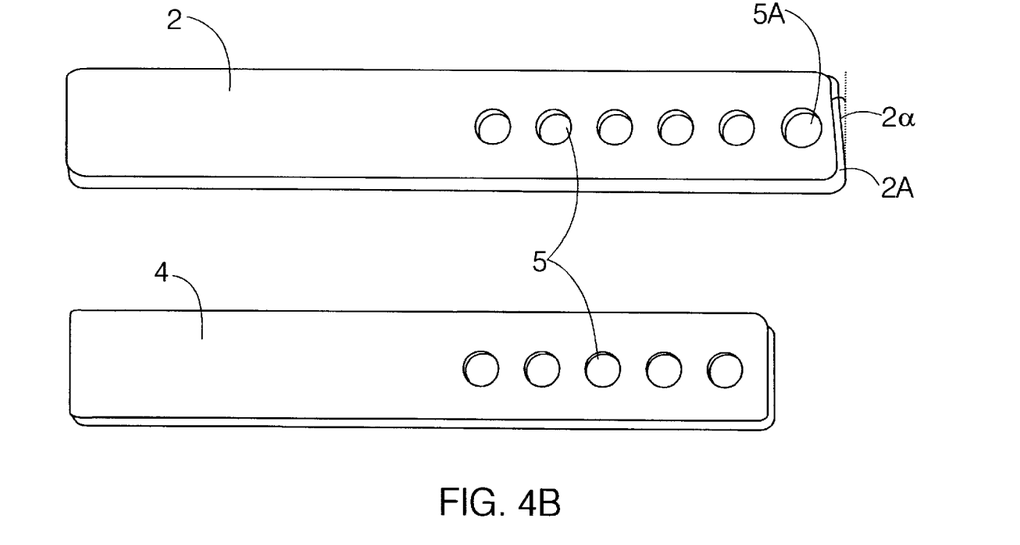
FIG. 4B shows the lower doubler-strap and lower filler-strap of the present invention.

FIG. 4A shows elements of the Preferred Embodiment of the present invention: a lower doubler-strap 1, and a lower filler-strap 3; FIG. 4B shows an upper doubler-strap 2 and an upper filler-strap 4, also according to the Preferred Embodiment. As can be seen, wing-attach bolt-holes 5 are provided in each of the doubler-straps 1, 2 and the filler-straps 3, 4. These wing-attach bolt-holes 5 correspond in size and alignment to the wing-attach bolt-holes 8 through the wing-spar web 6, shown in FIG. 3. A cap-angle bolt-hole 5A is provided through an inboard end 1A of the upper doubler-strap 1 and also through an inboard end 2A of the lower doubler-strap 2. These cap-angle bolt-holes 5A corresponds in size and alignment to the flange bolt-hole 7B on the respective end of the cap angle 7.

The upper and lower doubler-straps 1, 2 are constructed to fit all models of Lake aircraft. Thus, for example, all lower doubler-straps 1 have the same lower-strap width, length, and thickness dimensions, regardless of which airplane model they are to fit, and all upper doubler-straps 2 have the same upper-strap width, length, and thickness dimensions. The lower filler-straps 3 and the upper filler-straps 4, on the other hand, have a thickness dimension that depends on the particular model of aircraft, or rather, the particular wing model, into which they are to be installed. In the Preferred Embodiment, both doubler-straps 1, 2 are made of 4340 steel and heat treated to 180,000 psi, and have a thickness of approximately ³⁄₁₆". The approximate overall dimensions of the lower doubler-strap 1 are 9½" by 1¼", and those of the upper doubler-strap 2 are 8⁴⁰⁄₆₄" by 1¼". The approximate overall dimensions of the lower filler-strap 1 are 8⁷⁄₁₆" by 1¼" and those of the upper filler-strap 2 are 7⁴⁹⁄₆₄" by 1¼".

In the Preferred Embodiment, each of the filler-straps 3, 4 is made of 2024-T3 aluminum and treated with an alodine conversion coating, and then painted with a coating of epoxy primer to protect against corrosion. Each of the doubler-straps 1, 2 is treated with a SermeTel® coating protecting them from corrosion arising from electro voltaic effects (contact of dissimilar metals) and/or from exposure to a sea water environment. The inner walls of the bolt-holes 5, 5A, 7B, and 8, as illustrated by way of example by bolt-hole innerwall 5C in FIG. 1, are not coated, so as to maintain the tight tolerances called for. These holes are close-tolerance wing-attach bolt-holes with tolerances of +0.003 inch and are plugged during the coating processes to prevent the coating being applied to the inner walls.

Figure 5:
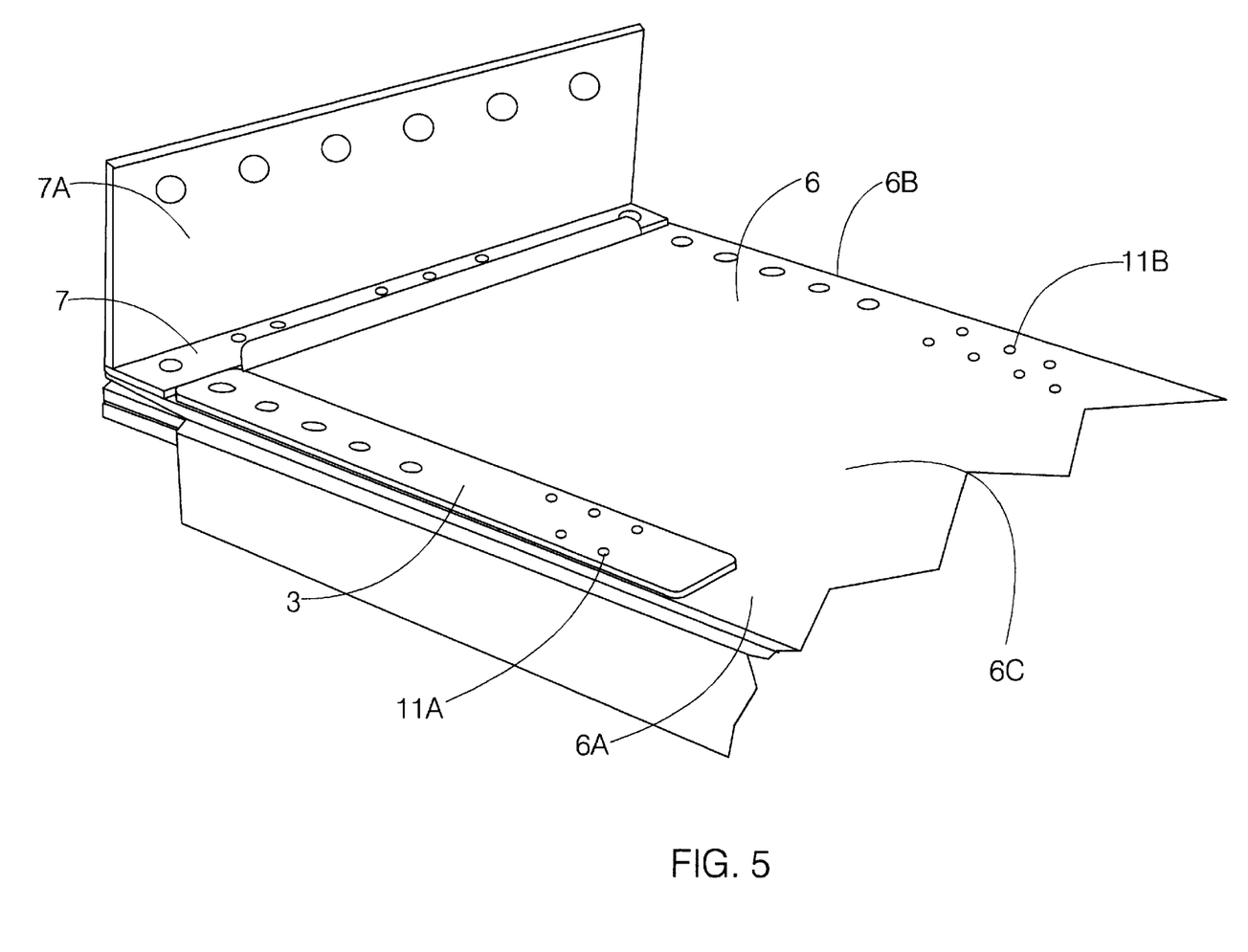
FIG. 5 shows the isolated wing spar shown in FIG. 3, with the upper filler-strap of the Preferred Embodiment of the present invention in place for installation and rivet holes drilled through the wing-spar web 6.

As can be seen in FIGS. 4A and 4B, the inboard end 1A of the lower doubler-strap 1 has an inboard-end angle 1α and the inboard end 2A of the upper doubler-strap 2 has an inboard-end angle 2α. In the Preferred Embodiment the inboard-end angle 1α on the lower doubler-strap 1 is approximately 6° and the inboard-end angle 2α on the upper doubler-strap 2 is approximately 5°. These angles correspond with the angle of the cap-angle flange 7A relative to the length dimension of the wing-spar web 6, so that the lower doubler-strap 1 and the upper doubler-strap 2 can fit against or close to the cap angle 7 without causing additional stress to the cap angle 7 or other wing components as a result of undue force applied by the respective doubler-strap 1, 2. As can be seen in FIG. 3, the cap-angle flange 7A exists on the face forward side 6C of the wing spar web 6 and, therefore, the cap angle 7 and the wing spar web 6 together do not provide a flat surface on which to place the doubler-straps 1, 2. FIG. 5 shows the upper filler-strap 3 in place for installation on the upper edge 6A of the wing spar, as well as an upper series of rivet holes 11A and a lower series of rivet holes 11B that have been drilled through the wing-spar web 6 and the corresponding filler-strap.

Figure 6:
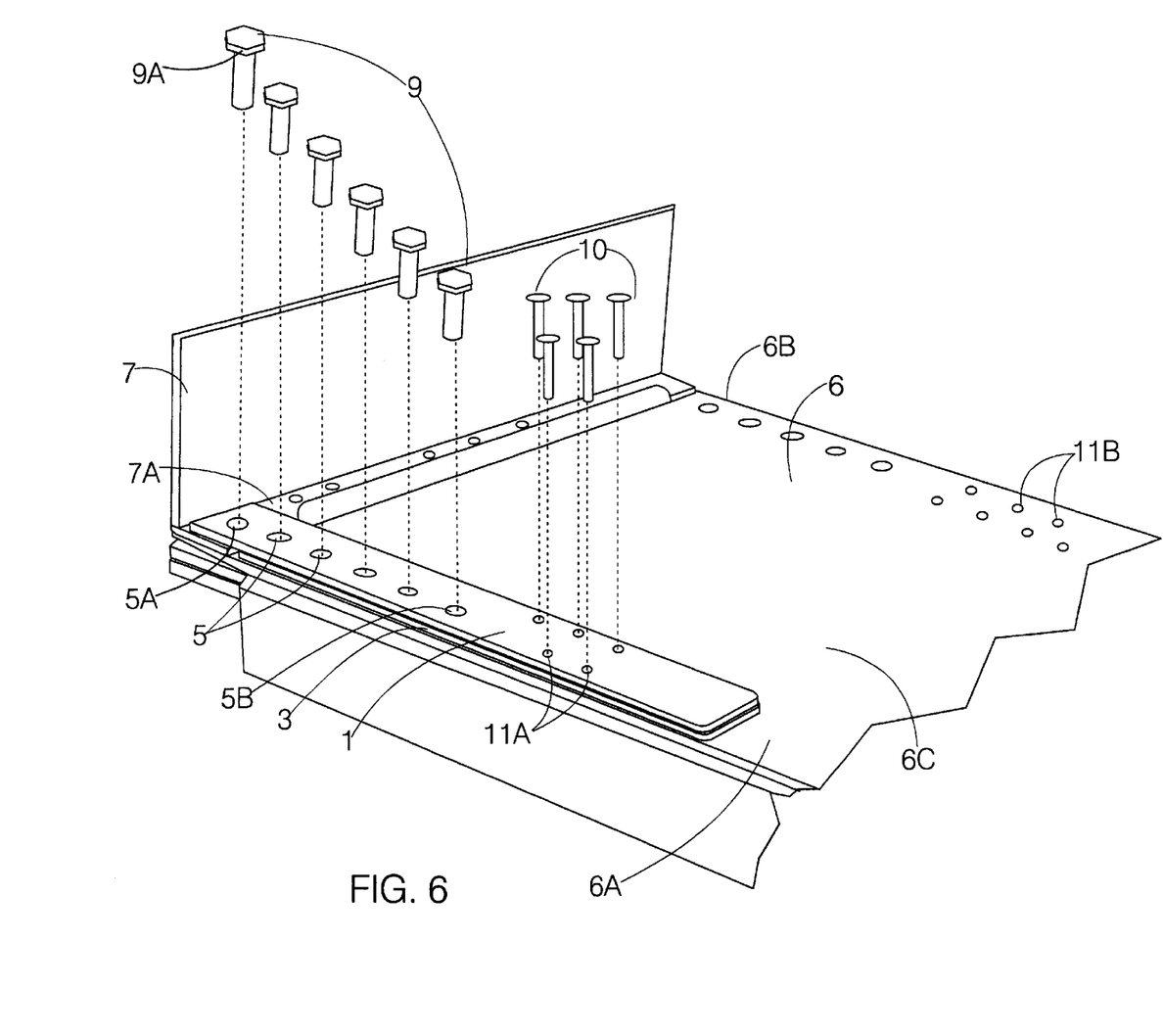
FIG. 6 shows a perspective view of the isolated wing spar with the upper filler-strap and upper doubler-strap of the present invention in place, showing bolts and rivets reading for insertion.

A Preferred Embodiment of the modification kit includes the lower doubler-strap 1 and the upper doubler-strap 2, the lower filler-strap 3 and the upper filler-strap 4 for the particular aircraft, a plurality of wing-attach bolts 9 and a cap angle bolt 9A, a plurality of AD 6-22 rivets 10, and a plurality of nuts and washers (not shown) to secure the bolts. FIG. 6 shows the same assembly as shown in FIG. 5, with the upper doubler-strap 1 placed along the upper filler-strap 3 and on the cap-angle flange 7A. As mentioned above, the root rib 22 of the aircraft is tipped outward so that an upper end of the rib 22 is farther from a central longitudinal axis of the airplane than is a lower end of the rib 22. Thus, the upper edge 6A of the wing spar web 6 is shorter than the lower edge 6B. For this reason, the upper series of rivet holes 11A has five holes and the lower series of rivet holes 11B has seven holes, as illustrated in FIG. 5. Both the upper and lower series of rivet holes 11A, 11B are drilled through the wing-spar web 6, the respective upper or lower filler-straps 3, 4 and doubler-straps 1, 2 during the retrofitting or installation process—preferably by clamping or fastening the filler-straps 3, 4 onto the respective upper or lower edge of the wing spar web 6 and then back-drilling through the wing spar web 6 through the filler-straps 3, 4. The filler-straps 3, 4 are then removed from the wing spar web 6 and the locations of the rivet holes 11 in the particular left-wing or right-wing, upper or lower filler-strap 3, 4 carefully transferred to the respective right-wing or left-wing, lower doubler-strap 1 or upper doubler-strap 2 and the upper and lower series of rivet holes 11A, 11B drilled accordingly through the respective upper doubler-strap 2 and lower doubler-strap 1.

The lower doubler-strap 1, upper doubler-strap 2, lower filler-strap 3, and upper filler strap 4 are printed with a part number on the "face forward" side of the respective part, so that when the part is oriented for installation on the face forward side 6C of the wing spar web 6, the part number is readily visible to the person installing the straps. This ensures that a left-hand or right-hand modification kit is properly installed on the wing spar.

The embodiment mentioned herein is merely illustrative of the present invention. It should be understood that variations in construction and installation of the present invention may be contemplated in view of the following claims without straying from the intended scope and field of the invention herein disclosed.

What is claimed is:

1. A modification kit for retrofitting a wing spar on an amphibious airplane, said airplane having a root rib, and said wing spar comprising a wing-spar cap angle that is attached to a wing spar web, said wing spar web having an upper edge and a lower edge and an inboard end that attaches to said root rib, a first series of wing-attach bolt-holes that is provided in said upper edge and a second series of wing-attach bolt-holes that is provided in said lower edge of said wing spar web, wherein said root rib is angled relative to a vertical plane of said amphibious airplanes, and wherein said inboard end of said wing spar has an inboard-end angle that corresponds to an angle of said root rib, said modification kit comprising:

an upper doubler-strap and an upper filler-strap;

a lower doubler-strap and a lower filler-strap; and a plurality of wing-spar attachment-bolts;

wherein each said upper filler-strap and each said upper doubler-strap have a third series of wing-attach bolt-holes that corresponds precisely with a first series of wing-attach bolt-holes in an upper edge of a wing spar web, and said lower filler-strap and said lower doubler-strap have a fourth series of wing-attach bolt-holes that corresponds precisely with a second series of wing-attach bolt-holes in a lower edge of said wing spar;

wherein said upper and said lower doubler-straps have a doubler-protective-coating and said upper and said lower filler-straps have a filler-protective-coating, and wherein said upper doubler-strap has an upper inboard-end angle and said lower doubler-strap has a lower inboard end angle.

2. The kit of claim 1, wherein said upper and said lower doubler-straps are made of 4340 steel.

3. The kit of claim 2, wherein said upper and said lower doubler-straps are heat-treated to 180,000 psi.

4. The kit of claim 1, wherein said upper and said lower filler-straps are made of 2024-T3 aluminum.

5. The kit of claim 1, wherein said upper inboard-end angle on said upper doubler-strap is approximately 5°.

6. The kit of claim 1, wherein said lower inboard-end angle on said lower doubler-strap is approximately 6°.

7. The kit of claim 1, wherein said doubler-protective coating is a powder coating that is heat-cured to form a ceramic coating.

8. The kit of claim 1, wherein said filler-protective-coating includes a first coating that is an alodine conversion coating and a second coating that is an epoxy primer.

9. The kit of claim 1, wherein each bolt-hole of said third and fourth series of said wing-attach bolt-holes in said upper doubler-strap, said lower doubler-strap, said upper filler-strap, and said lower filler-strap is free of said doubler-protective-coating and of said filler-protective-coating.

10. The kit of claim 1, wherein said first and said second series of wing-attach bolt-holes in said wing spar web is a series of five wing-attach bolt-holes and wherein said wing-spar cap angle has a flange with at least an upper wing-attach bolt-hole and a lower wing-attach bolt-hole, and wherein each of said third and fourth series of wing-attach bolt-holes in said upper doubler-strap and said lower doubler-strap, respectively, includes a series of five bolt-holes that align with said five wing-attach bolt-holes in said wing spar web and a cap-angle flange bolt-hole at said strap inboard end that aligns with said upper wing attach bolt-hole in said cap angle, and wherein each of said third and fourth series of bolt-holes in said upper filler-strap and said lower filler-strap, respectively, is a series of five bolt-holes that align respectively with said five wing-attach bolt-holes in said upper edge and said lower edge of said wing spar web.

11. The kit of claim 8, wherein said wing spar web has a first series of rivet holes on said upper edge and a second series of rivet holes on said lower edge, and said upper doubler-strap and said upper filler-strap each have a series of rivet holes that corresponds to said first series of rivet holes and said lower doubler-strap and said lower filler-strap each have a series of rivet holes that corresponds to said second series of rivet holes.

12. The kit of claim 9, wherein said upper doubler-strap and said upper filler-strap each have a series of five rivet holes and said lower doubler-strap and said lower filler-strap each have a series of seven rivet holes.

13. The kit of claim 1, further comprising a plurality of wing-attach bolts, a plurality of cap angle bolts, a corresponding plurality of nuts and washers for said wing-attach bolts and said cap angle bolts, and a plurality of rivets.

14. The kit of claim 13, wherein said plurality of wing-attach bolts includes ten NAS 464 6A24 bolts, said plurality of cap-angle bolts includes two NAS 464-7A24 bolts, said plurality of nuts and washers includes two AN 364-720 nuts, ten AN 364-624 nuts, four AN 960-716 washers and twenty AN960-616 washers, and said plurality of rivets includes twelve AN-470-AD6-22 rivets.

* * * * *

(12) INTER PARTES REEXAMINATION CERTIFICATE (0238th)
United States Patent
Tarbox et al.

(10) Number: US 6,328,260 C1
(45) Certificate Issued: Mar. 8, 2011

(54) WING SPAR MODIFICATION KIT

(75) Inventors: Jack M. Tarbox, Sanford, ME (US); Philip J. Baker, Laconia, NH (US)

(73) Assignee: Enpat, Inc., Melbourne, FL (US)

Reexamination Request:
No. 95/000,005, Jul. 15, 2002
No. 90/006,330, Jul. 16, 2002

Reexamination Certificate for:
Patent No.: 6,328,260
Issued: Dec. 11, 2001
Appl. No.: 09/696,127
Filed: Oct. 25, 2000

(51) Int. Cl.
*B64F 5/00* (2006.01)
*B64C 1/06* (2006.01)
*B64C 1/00* (2006.01)

(52) U.S. Cl. .................... 244/131; 244/123.1
(58) Field of Classification Search ........... None
See application file for complete search history.

(56) References Cited

PUBLICATIONS

Revo, Inc., "Service Bulletin B-79," May 27, 1999, 4 pages.
Federal Aviation Administration, Department of Transporation, "Notice of Proposed Rulemaking," Oct. 6, 1999, 8 pages.
Lake Aircraft Corp., Revo Division, "Blueprint of Lake–LA–4 Aircraft," Jan. 1964, 1 page.
The Aviation Consumer, "Lake Amphibians," Sep. 1999 Issue, pp. 24–27, 29–32.
Lake Aircraft Corp., Revo Division, "Drawing of Trunnion and Washer Inspection," Jan. 3, 1995, 2 pages.
United States Military Handbook, Mil–HDBK–5H, "Metallic Materials and Elements for Aerospace Vehicle Structures," Dec. 1, 1998, 12 pages.
Lee Erb, "Corrosion Protection—Introduction," downloaded from Experimental Aircraft Association, www.eaa1000.av.org, Jan. 1997, 3 pages.
The Corrosion Doctors, "Galvanic Corrosion," downloading from www.corrosion–doctors.org.aircraft/_galvdefi.htm Undated material, 3 pages.
E–Bush Pilot Web Site, "Seaplanes and Salt Water: To Operate or Not to Operate," downloaded from www.ebush-pilot.com/seasalt.htm, undated material, 13 pages.
Lake Aircraft, "Approved Sealants and Methods of Use," Lake Aircraft Maintenance Manual, Section 7, Airframe Section, p. 4.
U.S. Dept. of Transportation, Advisory Circular, Sep. 8, 1998, AC43.13–1B, pp. 4–11, 4–40, 6–11, 6–12, 7–5, 7–49, 7–60, 7–63 and 7–69.
Federal Aviation Regulation, Feb. 1, 1965, Section 23.609.
IAP, Inc., Standard Aviation Maintenance Handbook, 1985, pp. 80, 88–89, 93.

*Primary Examiner*—Peter C. English (57) ABSTRACT

A kit for reinforcing the wing spar attachment of Lake models of amphibious airplanes. The kit includes two filler-straps and two doubler-straps for each wing spar, and the necessary bolts, rivets, washers and nuts to attach the straps to the wing spar web. The doubler-straps are constructed to fit all models of Lake amphibious airplanes; the thickness of the filler-straps is, however, specific to the model of airplane or the model of wing in which they are to be installed. The doubler-straps and the filler-straps are pre-treated to protect them against corrosion and are marked so as to preclude incorrect inspection. The inboard end of the doubler-strap is angled to correspond to the angle of the wing spar relative to a vertical plane of the airplane.

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-14 is confirmed.

* * * * *